United States Patent
Zhou et al.

(10) Patent No.: US 8,976,437 B2
(45) Date of Patent: Mar. 10, 2015

(54) TRANSFLECTIVE ELECTROCHROMIC LIQUID CRYSTAL DISPLAY DEVICE

(75) Inventors: Xiaodong Zhou, Beijing (CN); Jaegeon You, Beijing (CN); Jikai Yao, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 46 days.

(21) Appl. No.: 13/699,562

(22) PCT Filed: Aug. 16, 2012

(86) PCT No.: PCT/CN2012/080251
§ 371 (c)(1),
(2), (4) Date: Nov. 21, 2012

(87) PCT Pub. No.: WO2013/023613
PCT Pub. Date: Feb. 21, 2013

(65) Prior Publication Data
US 2013/0222748 A1    Aug. 29, 2013

(30) Foreign Application Priority Data

Aug. 18, 2011    (CN) .................. 2011 2 0303313 U

(51) Int. Cl.
*G02F 1/15*    (2006.01)
*G02F 1/155*    (2006.01)
(Continued)

(52) U.S. Cl.
CPC .......... *G02F 1/133512* (2013.01); *G02F 1/167* (2013.01); *G02F 1/133514* (2013.01);
(Continued)

(58) Field of Classification Search
CPC .............. G02F 1/55; G02F 1/15; G02F 1/157
USPC ........... 359/265–266, 271, 273; 349/103, 114
See application file for complete search history.

(56) References Cited

U.S. PATENT DOCUMENTS

2006/0164569 A1* 7/2006 Sobek et al. .................... 349/96
2007/0126676 A1* 6/2007 Kim et al. ....................... 345/88
(Continued)

FOREIGN PATENT DOCUMENTS

| CN | 1979297 A | 6/2007 |
| CN | 101097343 A | 1/2008 |
| CN | 101201523 A | 6/2008 |
| CN | 101859037 A | 10/2010 |
| JP | 4-139649 B2 | 6/2008 |

OTHER PUBLICATIONS

International Search Report mailed Jun. 12, 2012; PCT/CN2012/080251.
(Continued)

*Primary Examiner* — Nathanael R Briggs
(74) *Attorney, Agent, or Firm* — Ladas & Parry LLP

(57) ABSTRACT

According to an embodiment of the present invention, there is disclosed a transflective electrochromic liquid crystal display device, comprising a first electrode layer, a second electrode layer and an electrochromic layer and a liquid crystal layer, wherein the electrochromic layer is located between the first electrode layer and the second electrode layer. The present invention can achieve a good display effect in each of a reflective mode and a transmissive mode; and production costs are low, and resolution and aperture ratio can be increased.

14 Claims, 3 Drawing Sheets

(51) Int. Cl.
  *G02F 1/153* (2006.01)
  *G02F 1/157* (2006.01)
  *G02F 1/1335* (2006.01)
  *G02F 1/167* (2006.01)

(52) U.S. Cl.
  CPC ......... *G02F2201/44* (2013.01); *G02F 2203/09* (2013.01); *G02F 2203/62* (2013.01); *G02F 2203/34* (2013.01)
  USPC ........... 359/265; 359/266; 359/271; 359/273; 349/106; 349/114

(56) References Cited

U.S. PATENT DOCUMENTS

| 2008/0002110 A1* | 1/2008 | Choi ............................. 349/106 |
| 2008/0137168 A1* | 6/2008 | Abe .............................. 359/273 |
| 2010/0002282 A1* | 1/2010 | Agrawal et al. ............... 359/275 |
| 2012/0081776 A1* | 4/2012 | Yeh et al. ...................... 359/273 |

OTHER PUBLICATIONS

International Preliminary Report on Patentability dated Feb. 18, 2014; PCT/CN2012/080251.

* cited by examiner

TRANSFLECTIVE ELECTROCHROMIC LIQUID CRYSTAL DISPLAY DEVICE

TECHNICAL FIELD

An embodiment of the present invention relates to a transflective electrochromic liquid crystal display device.

BACKGROUND

Display modes for liquid crystals can roughly be divided into a vertical electric field mode and a horizontal electric field mode. As for the horizontal electric field mode, there are an In-Plane-Switching (IPS) mode, a Fringe Field Switching (FFS) mode, and etc.

The structure of an existing vertical electric field mode liquid crystal display device is shown in FIG. 1, and from bottom to top, the structure comprises: a backlight source 60, a first polarizer 71, a first substrate (TFT array substrate) 70, a first electrode layer 72, a first alignment layer 73, a liquid crystal layer 90, a second alignment layer 83, a second electrode layer 82, a second substrate (i.e., color filter substrate) 80, a second polarizer 81. In addition, it further comprises a plurality of spacers 100 located between the first substrate and the second substrate.

A transflective liquid crystal display device is to divide each of an existing sub-pixel area into two parts (see FIG. 2, FIG. 3): a transmissive area and a reflective area. Based on whether the thickness of a liquid crystal cell in the transmissive area is the same as that in the reflective area or not, the transflective liquid crystal display device may be divided into two kinds. FIG. 2 illustrates a display mode that the thicknesses of a liquid crystal cell both in the reflective area and in the transmissive area are uniform (both are $\lambda/2$). FIG. 3 illustrates a display mode that the thickness of a liquid crystal cell in the reflective area ($\lambda/4$) is half of the thickness of the liquid crystal cell in the transmissive area ($\lambda/2$). Each of FIG. 2 and FIG. 3 only illustrate a cross section of one pixel. Herein, $\lambda$ refers to wavelength. The transflective liquid crystal display device of FIG. 2 comprises: an upper polarizer 101, an upper glass substrate 102, liquid crystals 103, an upper $\lambda/4$ plate 104, a lower glass substrate 105, a lower $\lambda/4$ plate 106, and a lower polarizer 107; and the transflective liquid crystal display device of FIG. 3 comprises: an upper polarizer 201, an upper $\lambda/2$ plate 202, an upper glass substrate 203, liquid crystals 204, a lower glass substrate 205, a lower $\lambda/2$ plate 206, and a lower polarizer 207.

This structure of the transflective liquid crystal display device suffers from the drawbacks: in the transmissive mode, aperture ratio is decreased, and meanwhile display properties are lowered; in the reflective mode, what is realized by a liquid crystal layer is to modulate environmental light which enters the liquid crystal cell after passing through the upper polarizer and a color filter substrate, and therefore available contrast is limited, and image resolution is insufficient. Further, it is difficult to realize that a good display effect is obtained in each of the two modes, and the fabrication process is complicated.

SUMMARY

The technical problems aimed to be solved by the present invention comprise how to obtain a good display effect in both a reflective mode and a transmissive mode; how to reduce the production costs without decreasing resolution and aperture ratio.

For solving the above technical problems, an embodiment of the invention provides a transflective electrochromic liquid crystal display device, comprising a first electrode layer, a second electrode layer and an electrochromic layer, wherein the electrochromic layer is located between the first electrode layer and the second electrode layer, and the first and second electrode layers are adapted to apply an electric field to the electrochromic layer so as to change a color of the electrochromic layer.

For example, the second electrode layer, the electrochromic layer and the first electrode layer are located on three different film layers.

For example, the second electrode layer, the electrochromic layer and the first electrode layer are located on a same film layer.

For example, the display device further comprises a liquid crystal layer, and the second electrode layer, the electrochromic layer and the first electrode layer are located on a same side of the liquid crystal layer.

For example, the display device further comprises a first substrate, and the second electrode layer is located between the first substrate and the electrochromic layer.

For example, the electrochromic layer comprises at least one pixel region, and the pixel region comprises three horizontally or vertically arranged sub-regions appearing in cyan, carmine and yellow, respectively, in which each of the sub-regions corresponds to a sub-pixel.

For example, the display device further comprises a second substrate, and the second substrate is located on an opposite side of the first electrode layer with respect to the liquid crystal layer.

For example, the first substrate is a thin film transistor array substrate.

For example, the second substrate is a white glass substrate.

For example, the display device further comprises a first polarizer, wherein the first polarizer is formed on one side of the first electrode layer, and located between the first electrode layer and the liquid crystal layer.

For example, the display device further comprises a second polarizer, and the second polarizer is formed on another side of the second substrate with respect to the liquid crystal layer.

For example, the display device further comprises a first polarizer, wherein the first polarizer is located on another side of the first substrate with respect to the liquid crystal layer.

For example, the thin film transistor array substrate is of a vertical electric field driving type or a horizontal electric field driving type.

For example, the display device further comprises a backlight source, which is located on another side of the first substrate with respect to the liquid crystal layer.

An embodiment of the present invention adopts a display device structure in which the array substrate and the color filter substrate are inverted, and a good display effect can be achieved in each of a reflective mode and a transmissive mode. In the reflective mode, an environmental light is directly reflected by an electrochromic layer for display; and in the transmissive mode, an equivalent display effect can be obtained as compared to an existing transmissive liquid crystal display device.

In the structure of an embodiment of the present invention, the electrochromic layer is used to replace a color filter, the electrochromic layer is disposed between two electrode layers or disposed on a same film layer as the first electrode layer and the second electrode layer, so that the whole sub-pixel region can act as not only a transmissive area, but also a reflective area, and resolution and aperture ratio are not decreased.

BRIEF DESCRIPTION OF THE DRAWINGS

In order to clearly illustrate the technical solution of the embodiments of the invention, the drawings of the embodiments will be briefly described in the following; it is obvious that the described drawings below are only related to some embodiments of the invention and thus are not limitative of the invention.

DETAILED DESCRIPTION

Thereinafter, specific embodiments of the present invention will be further described in detail in connection with the accompanied drawings and embodiments. The following embodiments are used to explain the present invention, but not to limit the scope of the present invention.

In embodiments of the present invention, an electrochromic material is used. Electrochromic refers to a phenomenon that a stable, reversible color change can occur for optical properties (such as, reflectivity, transmissivity, absorption rate, etc.) of a material under an externally applied electric field.

Electrochromic materials can be divided into inorganic electrochromic materials and organic electrochromic materials, and each of them can be formed to be a film. Inorganic electrochromic materials mainly include transition metal oxides or hydrates, such as, $WO_3$ (blue), $V_2O_5$ (yellow), $NiO_x$ (deep bronze), and etc. Organic electrochromic material, based on structure, mainly include various organic heterocyclic compounds, such as dipyridyl salts, conductive polymers, metal organic polymers and metal phthalocyanines. Organic electrochromic materials can achieve different colors by selecting different substituent groups. For example, with three substances such as biphenyl dicarboxylic acid diethyl ester, diacetybenzene, dimethyl terephthalate and etc. As the electrochromic material, a device gives rise to change according to three primary colors of yellow, cyan and pinkish red, or change according to three colors of red, green, and blue by changing substitute groups on viologen.

First Embodiment

Figure 1:
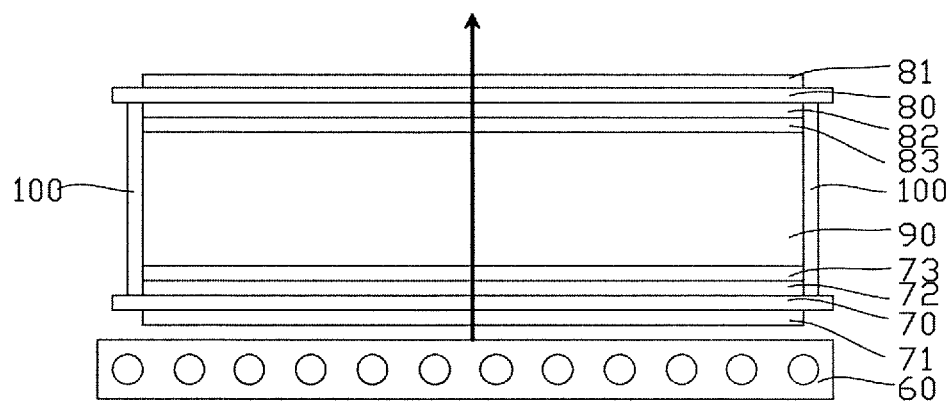
FIG. 1 is a structural schematic view showing an existing vertical electric field mode liquid crystal display device.
Figure 2:
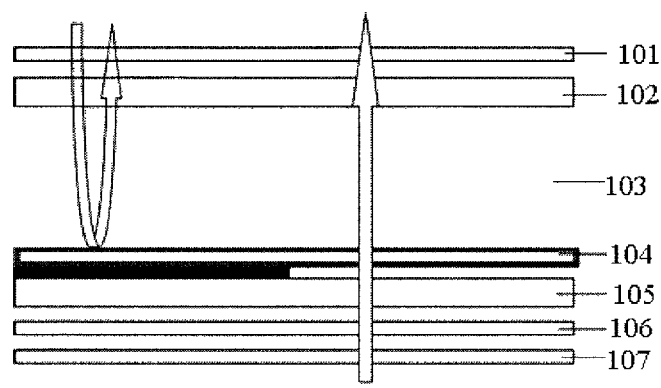
FIG. 2 is a structural schematic view of a display device showing the thickness of a liquid crystal cell in a reflective area and the thickness of the liquid crystal cell in a transmissive area are uniform.
Figure 3:
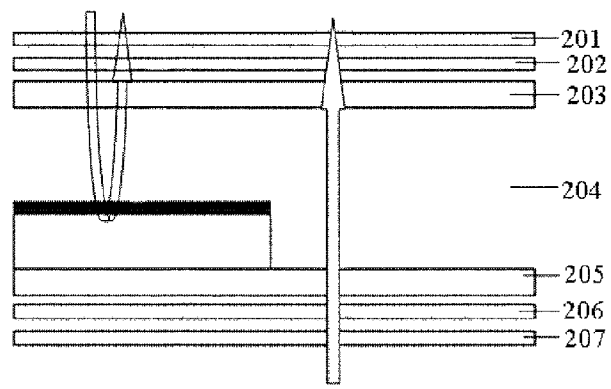
FIG. 3 is a structural schematic view of a display device showing a display mode that the thickness of a liquid crystal cell in the reflective area is half of the thickness of the liquid crystal cell in the transmissive area.
Figure 4:
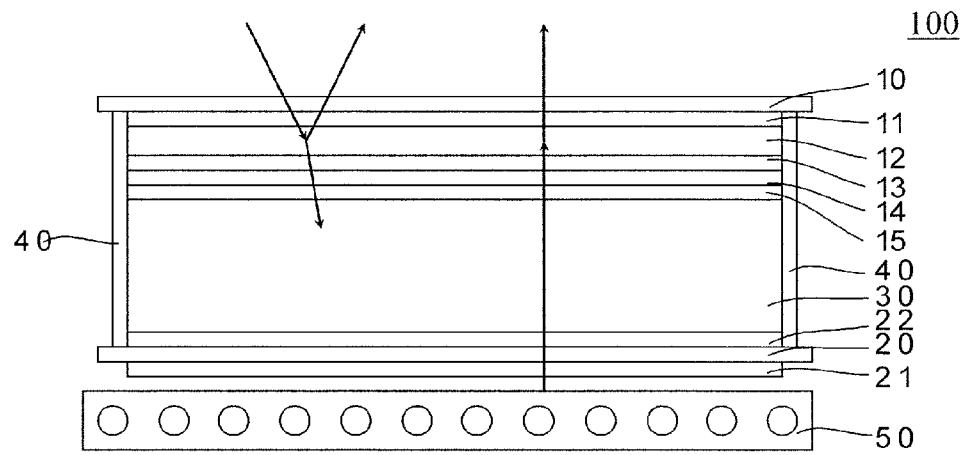
FIG. 4 is a structural schematic view showing a liquid crystal display device of embodiment 1 of the present invention.

At first, a substrate configuration according to a first embodiment of the present invention is described with reference to FIG. 4.

A liquid crystal display device 100 of the first embodiment adopts an inverted structure, i.e., a manner that an array substrate is on an upper side (display surface) with an opposed substrate being on a lower side. The transflective color liquid crystal display device 100 includes a first substrate 10, a second substrate 20, a first electrode layer 13, a second electrode layer 11, an electrochromic layer 12, a liquid crystal layer 30, a first alignment layer 15, a second alignment layer 22, a first polarizer 14, a second polarizer 21, a spacer or frame 40 and a backlight source 50.

The second substrate 20 is, for example, a white glass substrate, close to the side on which the backlight is provided, and used as an opposed substrate.

The first substrate 10 is parallel to the second substrate 20 and opposite to it, and for example, is a thin film transistor (TFT) array substrate, on which a TFT switch circuit structure for controlling each pixel of the liquid crystal display device is formed. The TFT array substrate comprises a plurality of gate lines and data lines, and these gate lines and data lines intersect each other so as to define a plurality of sub-pixel regions arranged in a matrix. Each of the sub-pixel regions comprises a thin film transistor as a switch element, a gate electrode of the thin film transistor is connected to a corresponding gate line, and a drain electrode thereof is, for example, connected to a corresponding data line.

The second electrode layer 11, the first electrode layer 13 and the first substrate 10 each are located on a same side of the liquid crystal layer 30, and the second electrode layer 11 contacts with the first substrate 10. The first electrode layer 13 and the second electrode layer 11 are, for example, transparent electrodes.

The electrochromic layer 12 functions as a color filter layer (CF), and is disposed between the second electrode layer 11 and the first electrode layer 13 to form a sandwich stack structure. The electrochromic layer 12, the second electrode layer 11 and the first electrode layer 13 are located on three different film layers. The second electrode layer 11 and the first electrode layer 13 are adapted to apply an electric field to the electrochromic layer 12, so as to control a color shown by the electrochromic layer 12.

The liquid crystal layer 30 is located between the first alignment layer 15 and the second alignment layer 22, and the first alignment layer 15 and the second alignment layer can be rubbed to form an alignment structure for liquid crystals.

One pixel can be divided, for example, into three sub-pixels, the electrochromic layer 12 comprises at least one pixel region, and the pixel region comprises, for example, three horizontally or vertically arranged sub-pixel regions appearing in cyan, carmine and yellow, respectively (If more abundant colors are desired, a primary element such as orange or the like can be added, and the number of the added primary element is determined according to the required design effect). Each of the sub-pixel regions corresponds to one sub-pixel, and for example, there may be three sub-pixel regions appearing in cyan, carmine and yellow, respectively (e.g., with reference to primary colors of an ink jetting printer). The individual sub-pixels have a horizontal or vertical arrangement structure.

The color of the sub-pixel regions is not limited to the combination of cyan, carmine and yellow, and can also be, for example, the combination of red, green and blue.

The display principle of the embodiment is introduced as follows. In a reflective mode, three kinds of light of cyan, carmine and yellow reflected by different electrochromic layers are mixed into a variety of colors for color display, luminance control of which is realized by means of changing reflectivity and transmissivity of the electrochromic layers by adjusting the applied electric fields. In a transmissive mode, light emitted from the backlight source 50 is transmitted through different electrochromica layers after modulated by the liquid crystal layer 30, so as to attain kinds of light in three colors of cyan, carmine and yellow, and these kinds of light are mixed into a variety of colors for color display.

In the above embodiment, the first polarizer 14 is located within the liquid crystal cell with respect to the first substrate 10, and this setting may not change intensity of the reflected light. In another embodiment, the first polarizer can be located outside the liquid crystal cell with respect to the first substrate 10, for example, attached to an outer side of the first substrate 10, and this setting is easy to achieve in process.

Figure 6:
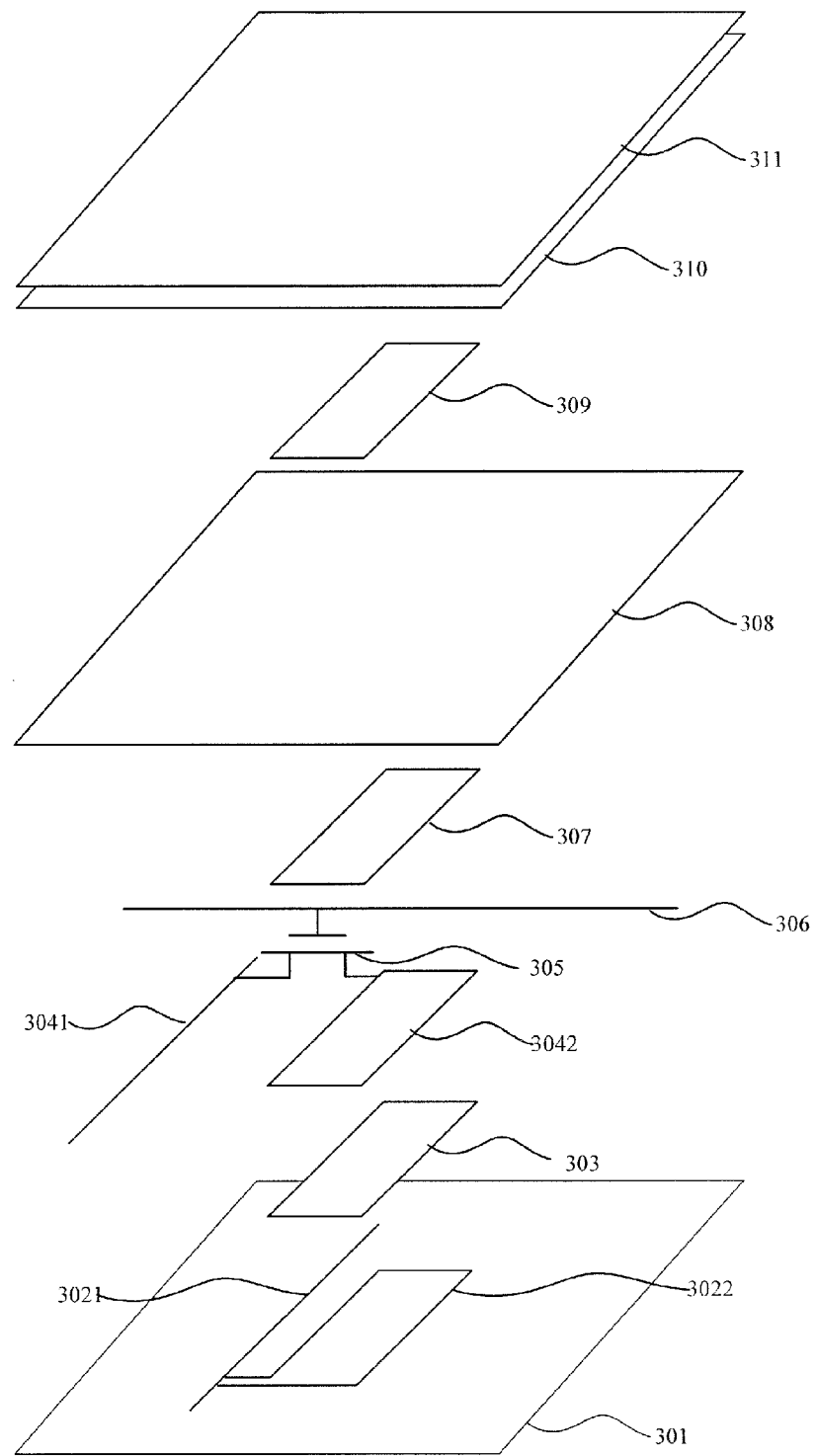
FIG. 6 is a structural schematic view showing a liquid crystal display device obtained by a fabrication method according to embodiment 1 of the present invention.

A manufacture procedure of a liquid crystal display device of the embodiment comprises a fabrication process of an array substrate, a fabrication process of an opposed substrate, a cell-assembling process, and etc. Regarding the manufacture procedure, the following description is made with reference to FIG. 6. FIG. 6 is a schematic view only showing one pixel region, but as would be understandable by those skilled in the art, other pixel regions can be fabricated in the same steps.

Firstly, an array substrate is fabricated.

1. A glass substrate 301, for example, is prepared as a base substrate. The glass substrate is cleaned by a process, such as, water cleaning, acid cleaning, ultrasound wave cleaning, air knife, etc., to meet subsequent production requirements.

2. A metal thin film is firstly deposited on the glass substrate 301, and is patterned by a photolithography process to obtain a metal electrode wiring 3021; and then, a transparent conductive material (such as, indium tin oxide (ITO), indium zinc oxide (IZO), tin oxide, etc.) is deposited on the glass substrate 301 to obtain a transparent conductive film, and the transparent conductive film is patterned by a photolithography process to form a first electrode layer 3022. Next, an insulating layer is obtained by using a chemical vapor deposition (CVD) method so as to cover the metal electrode wiring 3021 and the first electrode layer 3022.

3. By using a screen printing technology, a printing technology or the like, three electrochromic materials of, such as, cyan, carmine, or yellow are produced on the first electrode layer 3022, so as to obtain an electrochromic layer. Next, an insulating layer is formed on the electrochromic layer by using a chemical vapor deposition method.

4. A metal thin film is deposited and is patterned by using a photolithography process, so as to obtain a metal electrode wiring 3041 as a data line; and then, a transparent conductive material (such as, ITO, IZO, tin oxide, or the like.) is deposited to accordingly obtain a transparent conductive film, and the transparent conductive film is patterned by using a photolithography process, so as to form a second electrode layer 3042. The second electrode layer 3042 functions as a pixel electrode, and for example, can comprise a slit or be formed to be a comb-like electrode.

5. A thin film transistor 305 is manufactured as a switch element of a pixel region. The thin film transistor comprises a gate insulating film, an active layer, a source electrode, a drain electrode. For example, the drain electrode of the thin film transistor 305 is connected to the metal electrode wiring 3041, and the source electrode is connected to the second electrode layer 3042.

6. A metal thin film is deposited, and patterned by using a photolithography process, so as to obtain a metal electrode wiring 306 and a gate electrode of the thin film transistor. The metal wiring 306 as a gate line is connected to the gate electrode of the thin film transistor.

7. A transparent conductive material is deposited to obtain a transparent conductive film, and the transparent conductive film is patterned by using a photolithography process so as to obtain a common electrode 307. The common electrode 307, for example, can also comprise a slit or be formed to be a comb-like electrode, and acts to form a driving electric field for liquid crystals in cooperation with the second electrode layer (pixel electrode) 3042 after it is energized.

8. On a top surface of the above structure, a polarizer (not shown in FIG. 6) is formed. Up to here, the array substrate is obtained.

9. A test is performed on the array substrate.

Next, the opposed substrate is prepared.

10. The opposed substrate 311, such as, a white glass substrate, is prepared.

Next, the cell-assembling process is performed.

11. Alignment layers 308, 310 are coated on the surfaces of the array substrate and the opposed substrate 311, respectively, and a rubbing alignment process is performed on the alignment layers.

12. Sealant (not shown) is coated on a surface of one of the array substrate and the opposed substrate, liquid crystals 309 are drop onto another, and then the two are disposed opposite to each other to form a liquid crystal cell. Subsequently, an ultraviolet solidification and/or thermal solidification are performed so as to obtain a liquid crystal panel.

13. The resultant liquid crystal cell is cut so as to obtain a single liquid crystal panel.

14. A polarizer is attached on the outside of the opposed substrate, and a driving circuit and a backlight source are added.

In the embodiment, the polarizer on the array substrate is formed within the liquid crystal cell with respect to the base substrate 301. In another embodiment, the polarizer on the array substrate may be formed outside the base substrate 301, so that the polarizer may be attached on the array substrate, for example, after cutting as the foregoing step 14.

The present embodiment can be applied, for example, to an FFS mode that liquid crystal molecules are rotated in a plain in a horizontal electric field driving mode. The thin film transistor 305 controls the electrochromic layer and the liquid crystal layer simultaneously.

However, in the embodiment, the circuit structure for driving the liquid crystal molecules is not limited to the case where the array substrate comprises a combination of the above second electrode layer 3042 and the common electrode 307. If necessary, in the embodiment, for example, the pixel electrode and the common electrode can also be formed on the same plane to attain an In-plane Switch (IPS) mode of a horizontal electric field driving type; alternatively, the pixel electrode is formed on the array substrate, and the common electrode is formed on the opposed substrate, so as to obtain, such as, a Twisted Nematic (TN) mode of a vertical electric field driving type. In addition, the electrochromic layer and the liquid crystal layer can be driven by using different switch circuits. The scope of the present invention is not limited by the driving manner of liquid crystals.

Second Embodiment

The structure and manufacture process of a second embodiment are substantially the same as those of the first embodiment. A liquid crystal display device 200 of the second embodiment comprises: a first substrate 10; a second electrode layer 11; an electrochromic layer 12; a first electrode layer 13; a first polarizer 14; a first alignment layer 15; a second substrate 20; a second polarizer 21; a second alignment layer 22; a liquid crystal layer 30; a spacer or sealant 40;

and a background source 50. The first and second embodiments differ in that the structure of the second embodiment is adjusted as follows.

Figure 5:
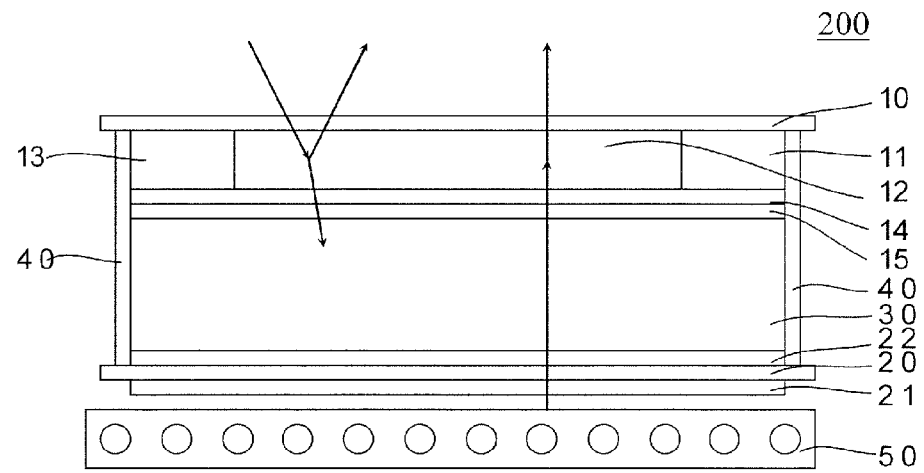
FIG. 5 is a structural schematic view showing a liquid crystal display device of embodiment 2 of the present invention.

As shown in FIG. 5, the electrochromic layer 12, the first electrode 13 and the second electrode 11 are transformed, from a top-and-bottom structure, to be located on a same film layer and are disposed adjacent to each other, and the electrochromic layer 12 is located between the first electrode 13 and the second electrode 11. The second electrode layer 11 and the first electrode layer 13 are adapted to apply an electric field to the electrochromic layer 12, so as to control a color shown by the electrochromic layer 12. The heights of the second electrode layer 11 and the first electrode layer 13 can be changed if necessary, so as to achieve a proper effect.

Likewise, in the above embodiment, the first polarizer 14 is located within a liquid crystal cell with respect to the first substrate 10, and this setting may not change intensity of the reflected light. In another embodiment, the first substrate 10 can be located outside the liquid crystal cell with respect to the first substrate 10, for example, attached to an outer side of the first substrate 10, and this setting is easy to achieve in process.

The manufacture method of the present embodiment is similar to that of the first embodiment, but differs in that, the electrochromic layer 12, the first electrode 13 and the second electrode 11 are provided on the same film layer and are disposed adjacent to each other.

The present embodiment can be applied to a liquid crystal in-plane switch (IPS) mode of a horizontal electric field driving type. Likewise, in the embodiment, the driving manner of liquid crystals can also be replaced with an FFS mode of the horizontal electric field type, a TN mode of a vertical electric field driving type, etc.

The display principle of the present embodiment is similar to that of the first embodiment. In a reflective mode, kinds of light of primary colors, such as light of cyan, carmine and yellow, are reflected by different electrochromic layers, and are mixed into a variety of colors for color display, the luminance control of which is realized by means of changing reflectivity and transmissivity of the electrochromic layers by adjusting the applied electric fields. In a transmissive mode, light from a backlight is transmitted through different electrochromic layers after modulated, so as to attain kinds of light in three colors of cyan, carmine and yellow, and these kinds of light are mixed into a variety of colors for color display.

The above embodiments are merely used to illustrate the present invention, but not to limit the present invention. Various modifications and variations can be made by those skilled in the related technical field without departing from the spirit and scope of the present invention. Therefore, all of equivalent technical solutions also come within the scope of the present invention, and the protection scope of the present invention should be defined by claims.

The invention claimed is:

1. A transflective electrochromic liquid crystal display device comprising: a first electrode layer, a second electrode layer and an electrochromic layer,
   wherein the electrochromic layer is located between the first electrode layer and the second electrode layer; and
   the first and second electrode layers are adapted to apply an electric field to the electrochromic layer so as to change a color of the electrochromic layer; and
   wherein the first and second electrode layers are located in a same film layer as the electrochromic layer, and the thicknesses of the first electrode layer, the second electrode layer and the electrochromic layer are same to one another;
   the device further comprising:
   a first substrate;
   a second substrate;
   a liquid crystal layer between the first and second substrates; and
   a first polarizer;
   wherein the first electrode layer, the second electrode layer and the electrochromic layer are located on the first substrate; the second substrate and the first electrode layer interpose the liquid crystal layer therebetween; the first polarizer is located between the first electrode layer and the liquid crystal layer.

2. The display device claimed as claim 1, wherein the second electrode layer, the electrochromic layer and the first electrode layer are located on three different film layers.

3. The display device claimed as claim 1, wherein the electrochromic layer comprises at least one pixel region, the pixel region comprises three horizontally or vertically arranged sub-pixel regions shown in cyan, carmine and yellow, respectively, in which each of the sub-pixel regions corresponds to a sub-pixel.

4. The display device claimed as claim 1, further comprising a liquid crystal layer, wherein the second electrode layer, the electrochromic layer and the first electrode layer are located on a same side of the liquid crystal layer.

5. The display device claimed as claim 4, further comprising a first substrate, wherein the first electrode layer, the second electrode layer and the electrochromic layer are located on the first substrate, and the second electrode layer is located between the first substrate and the electrochromic layer.

6. The display device claimed as claim 5, further comprising a second substrate, wherein the second substrate and the first electrode layer interpose the liquid crystal layer therebetween.

7. The display device claimed as claim 6, wherein the first substrate is a thin film transistor array substrate, and the second substrate is a white glass substrate.

8. The display device claimed as claim 6, further comprising a first polarizer, wherein the first polarizer is formed on one side of the first electrode layer, and located between the first electrode layer and the liquid crystal layer.

9. The display device claimed as claim 8, further comprising a second polarizer, wherein the second polarizer is formed on another side of the second substrate with respect to the liquid crystal layer.

10. The display device claimed as claim 6, further comprising a first polarizer, wherein the first polarizer is located on another side of the first substrate with respect to the liquid crystal layer.

11. The display device claimed as claim 10, further comprising a second polarizer, wherein the second polarizer is formed on another side of the second substrate with respect to the liquid crystal layer.

12. The display device claimed as claim 7, wherein the thin film transistor array substrate is of a vertical electric field driving type or a horizontal electric field driving type.

13. The display device claimed as claim 7, further comprising a backlight source which is located on another side of the first substrate with respect to the liquid crystal layer.

14. A transflective electrochromic liquid crystal display device comprising: a first electrode layer, a second electrode layer and an electrochromic layer, wherein the electrochromic layer is located between the first electrode layer and the second electrode layer; and the first and second electrode layers are adapted to apply an electric field to the electrochromic layer so as to change a color of the electrochromic layer;

the device further comprising:

a first substrate;

a second substrate;

a liquid crystal layer between the first and second substrates; and a first polarizer;

wherein the first electrode layer, the second electrode layer and the electrochromic layer are located on the first substrate; the second substrate and the first electrode layer interpose the liquid crystal layer therebetween; the first polarizer is located between the first electrode layer and the liquid crystal layer.

* * * * *